W. H. COOK.
MIRROR FASTENER.
APPLICATION FILED JULY 17, 1914.
1,138,846.
Patented May 11, 1915.
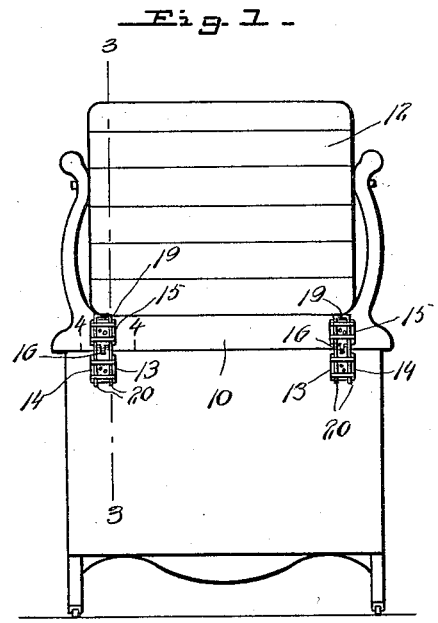
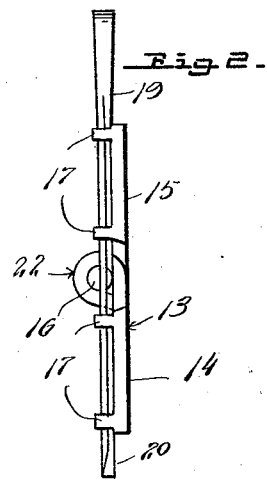
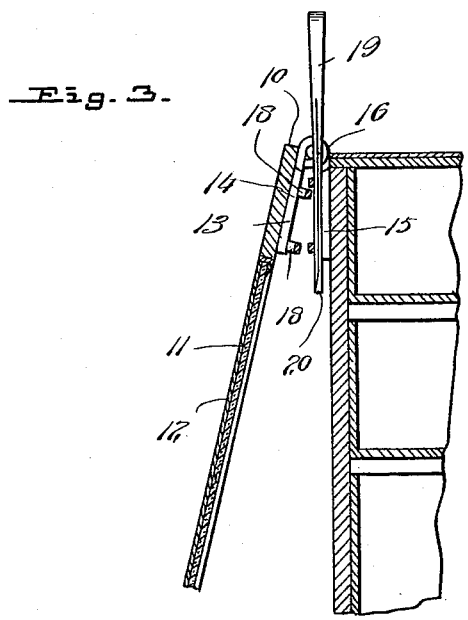
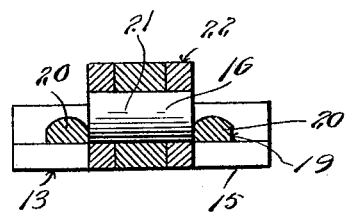
Witnesses
Inventor
W. H. Cook.
By
Attorneys

UNITED STATES PATENT OFFICE.

WILDER H. COOK, OF ATHENS, NEW YORK.

MIRROR-FASTENER.

1,138,846. Specification of Letters Patent. Patented May 11, 1915.

Application filed July 17, 1914. Serial No. 851,663.

*To all whom it may concern:*

Be it known that I, WILDER H. COOK, a citizen of the United States, residing at Athens, in the county of Greene, State of New York, have invented certain new and useful Improvements in Mirror-Fasteners; and I do hereby declare the following to be a full, clear, and exact description of the invention, such as will enable others skilled in the art to which it appertains to make and use the same.

This invention relates to improvements in fastening devices particularly designed for application to dressers, chiffonniers or the like, and adapted for securing the mirrors thereof in position.

An object of the invention resides in the provision of a fastener of this character which is constructed in such manner as to permit the mirror being swung, face in, and against the back of the article of furniture whereby said article may be packed and shipped intact.

A further object of the invention is to provide a mirror fastener in which the securing members thereof are hingedly connected together, the same means which is employed for locking the mirror in set up position, also serving to retain the hinge pin of said members in place.

With the above and other objects of similar nature in view, the invention consists in the construction, combination and arrangement of parts, set forth in and falling within the scope of the appended claim.

In the drawings: Figure 1 is a rear elevation of a dresser and the mirror therefor, with the invention applied thereto, Fig. 2 is a side elevation thereof, Fig. 3 is a vertical sectional view taken on the line 3—3 of Fig. 1, with the mirror in folded position, and Fig. 4 is a transverse sectional view taken on the line 4—4 of Fig. 1.

Referring now more particularly to the drawing, the numeral 10 designates the base of the dresser and 11 the mirror therefor, the latter being mounted in the usual frame as indicated at 12.

In detail, the fastening devices by which the frame 12 is secured to the dresser base and which are designated as a whole by the numeral 13, each comprise the attaching plates 14 and 15, said plates being arranged respectively at adjacent corners of the frame and base and being hingedly connected together as shown at 16. Formed on the outer faces of the plates 14 and 15 and arranged transversely thereof, are a pair of outwardly extending ribs 17 the same being provided with vertically alined openings 18, the purpose of which will presently appear.

For securing the frame 12 in its normal or set up position, there is provided a U-shaped locking member 19, the legs 20 of which are inserted downwardly through the openings 18 of the ribs and thus rigidly secure the plates 14 and 15 against relative movement.

In transporting the dresser from place to place or when packing same for shipment, the mirror 11 is reversed in the frame 12 and the locking member 19 is drawn from the openings, thus permitting the frame to be swung back against the dresser base with the face of the mirror disposed inwardly. The member 19 is then again inserted in the openings of one of the plates and the dresser is in readiness to be packed.

It will be noted that the pin 21 which forms the hinged connection between the plates 14 and 15, is loosely inserted within the hinge portions 22 thereof, and is held in such position by means of the locking member 19, the legs 20 of the latter snugly embracing said hinged portion and preventing the pin moving laterally therefrom. It will further be noted that, should it be desired to remove the mirror from the dresser base it is only necessary to withdraw the locking member 19 from the openings 18 and remove the pin 21 from the hinge portion 22, thus disconnecting the plates 14 and 15 and permitting the frame 12 to be readily detached.

What is claimed is:

A device of the kind described comprising a pair of attaching plates, hinge elements formed on said plates and having alined openings therein, a pin loosely inserted through said openings to hingedly connect said plates, ribs formed on said plates and provided with alined openings, and a U-shaped locking member inserted through said last-named openings to secure said plates against relative movement, the legs of said member embracing the hinge elements and retaining said pin in position therein.

In testimony whereof, I affix my signature, in the presence of two witnesses.

WILDER H. COOK.

Witnesses:
SARAH M. HYER,
ARCHIE PAGE.

Copies of this patent may be obtained for five cents each, by addressing the "Commissioner of Patents, Washington, D. C."